Jan. 12, 1932. L. H. WHEELER 1,840,648
PUMPING MEANS FOR GASOLINE GAUGES
Filed June 22, 1925
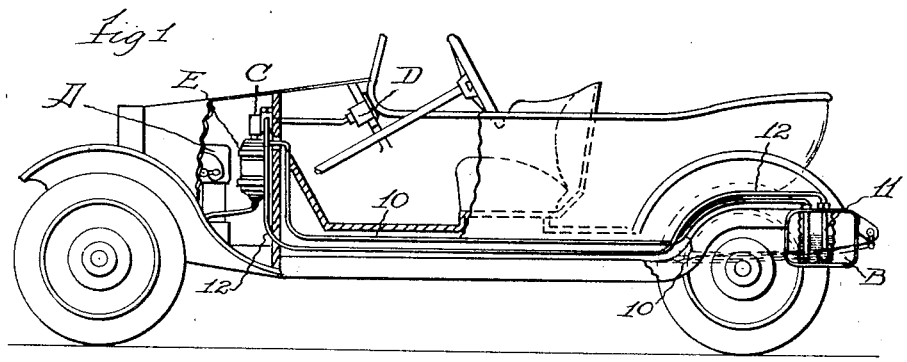
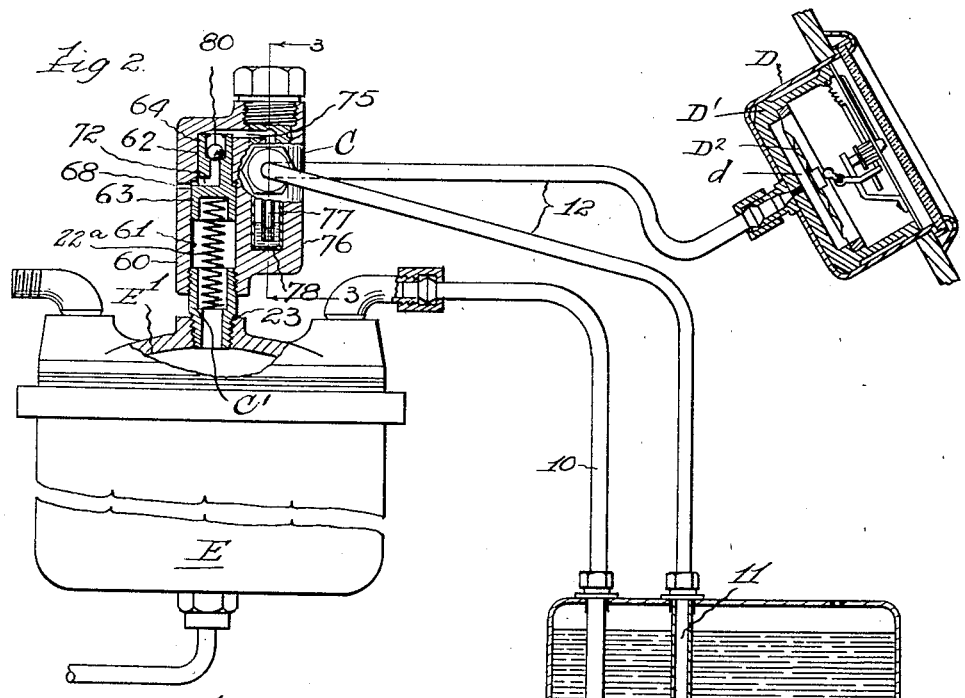
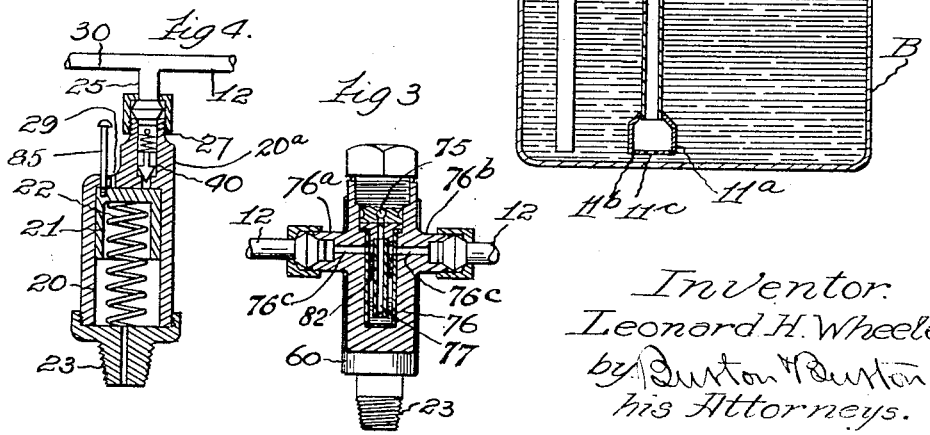
Inventor:
Leonard H. Wheeler.
by Burton & Burton
his Attorneys.

Patented Jan. 12, 1932

1,840,648

UNITED STATES PATENT OFFICE

LEONARD H. WHEELER, OF CHICAGO, ILLINOIS, ASSIGNOR TO STEWART-WARNER CORPORATION, OF CHICAGO, ILLINOIS, A CORPORATION OF VIRGINIA

PUMPING MEANS FOR GASOLINE GAUGES

Application filed June 22, 1925. Serial No. 38,946.

The purpose of this invention is to provide an improved construction of a depth indicating device, particularly adapted for indicating the depth of gasoline in the main fuel supply tank carried by a motor vehicle, having an indicating element or gauge face mounted upon the forward part of the vehicle and therefore at a considerable distance from the tank, the depth of whose liquid contents is to be indicated. It consists in the elements and features of construction shown and described as indicated in the claims.

In the drawings:

Figure 1 is a diagrammatic view presenting a motor vehicle having the fuel tank equipped with a device embodying this invention and connected for operation of the pumping device with the vacuum chamber of a vacuum fuel feed tank, the figure beng intended particularly to indicate the relative positions on the vehicle of the tank or fuel container and the depth gauge, and trace the connection between the two and with the vacuum tank.

Figure 2 is a diagrammatic view consisting of a vertical section of the fuel container and pressure pipe leading therefrom to the gauge, a vertical section of one form of the pumping device connected to the pipe line from the container pressure pipe to the pressure gauge, and a vertical section of a conventional construction of the nature of a pressure gauge.

Figure 3 is a section at the line 3—3 on Figure 2.

Figure 4 is a vertical section of a modified form of the pump chamber.

In the construction shown in the drawings, referring to the diagrammatic view of Figure 1, the engine to be supplied with the fuel is seen at A, the main fuel supply tank at the rear of the vehicle is seen at B. D indicates the pressure gauge mounted at the dash consisting of a casing, $D^1$, having its cavity partitioned by a flexible diaphragm, $D^2$, which forms a movable wall of a variable capacity chamber, $d$, to which pressure connection is made by a pipe, 12, as hereinafter more particularly described. The diaphragm $D^2$ is arranged to operate the index hand of the gauge for indicating the depth of liquid in the tank, B, in a manner which may be understood from the drawings without further description. E is the familiar vacuum tank to which the fuel is lifted by suction of the engine from the low tank, B, and which, in the present invention, has the vacuum chamber, $E^1$, connected by the pipe, $C^1$, with the pumping device indicated as to totality by the letter C.

The fuel pipe line leading from the main supply tank, B, to the vacuum tank, E, is indicated at 10. Mounted fixedly with respect to the tank, B, and dependent therein opening for intake in the tank at a point below the lowest liquid level to be indicated, is a pressure pipe, 11, which extends out through the top of the tank and is connected by a pipe, 12, with the chamber, $d$, of the pressure gauge, D, for communicating to the pressure-responsive element $D^2$ of the pressure gauge the pressure of the head of liquid in the tank, B, which, having sealed the lower intake end of the pipe, 11, tends to compress the air in that pipe more or less as the liquid head in the tank is greater or less, this pressure indicated at the pressure gauge being therefore a correct measure of the depth of the liquid in the tank, unless in any instance there be air leakage at any point in the pressure line between the tank and the pressure gauge, or the equivalent of air leakage consisting in the absorption of air by the liquid. The primary purpose of the present invention is to avoid error in the indication of the pressure gauge which may be due to absorption or leakage of the air which is liable to occur as above mentioned.

The expedient for this purpose consists,—stated generally,—in intermittently, preferably somewhat frequently, introducing air into the conduit which extends between the pressure gauge and the pressure pipe intake to an extent sufficient to momentarily cause a discharge of air from said conduit out through the intake of the pipe, 11, substituting fresh air forced in by the expelling means so that upon cessation of the pressure by which the air is thus expelled,—which pressure, so far as by reason of inertia of the liquid delaying its movement so that it may exceed that of the hydrostatic pressure of the liquid content of the tank, is relieved instantly upon the venting which occurs at the lower end of the pipe, 11, from which the air bubbles up through the liquid,—the head of liquid in the tank will operate normally for causing the liquid to be forced up into the pressure pipe and maintain the compression of the fresh air in normal condition therein for transmitting pressure to the pressure-responsive element of the pressure gauge which shall be truly indicative of the head of liquid in the tank.

In carrying out this expedient for freshening or rectifying the pressure-transmitting air in the pipe, 12, there is provided a pumping device adapted to be operated by the intermittent suction which is operative in the vacuum chamber of the vacuum tank, E. A simple form of this expedient is seen in Figure 4 consisting of a pump chamber, 20, having a piston, 21, reciprocating therein and normally held at one limit of its stroke in the chamber by a spring, 22, the piston chamber having connection through the opposite end with the vacuum chamber, E¹, of the vacuum tank, E, into the top of which the terminal nipple, 23, of said piston chamber is adapted to be screwed, as seen in Figure 2, with the obvious result that at the suction phase of the vacuum chamber the piston, 21, (referring to the form shown in Figure 4) is retracted against the resistance of the spring, 22, and produces a suction inflow of air through a port, 29, to the opposite end of the piston chamber, that is, to the opposite side of the piston from that at which the spring reacts upon it and at which the suction of the vacuum tank is communicated to said piston chamber. Said opposite end of the pump chamber is provided with a T fitting, 30, which serves for interposing the pump chamber in the pipe line, 12, which as above described, leads to the pressure gauge. the section of said pipe, 12, leading from the tank, B, being connected to one end of the cross arm of the T, and the other section leading to the pressure gauge being connected to the other end of said cross arm. In the upper terminal 20ª, of the pump chamber, 20 below the nipple, 27, to which the pipe, 25, is connected, there is provided a check valve, 40, opening for air flow toward the T and seating in the opposite direction preventing back flow toward the pump chamber.

Upon considering the operation of this device it will be seen that at the suction phase of the vacuum tank, the piston, 21, will be retracted in the pump chamber against the resistance of the spring, 22, drawing in air through the atmosphere vent, 29. And that upon the atmospheric pressure phase of the vacuum tank,—that is, upon the interruption of the suction,—the piston will be returned by the spring to its normal position, this action being quick and substantially instantaneous, so that the limited atmosphere vent afforded at 29 will not permit the air thus driven onward by the piston to escape to any considerable extent into the atmosphere, and it will in consequence be driven on past the check valve, 40, and through the connecting pipe, 25, to the T connection, and thence through the duct, 12, to the pressure pipe, 11, forcing back the liquid which may be upheld therein by the head of liquid in the tank, the air bubbling out at the lower end of said pressure pipe as above indicated, and upon the cessation of the pressure produced by the inthrust of the piston, the liquid will seal the intake of the pressure pipe, 11, being forced up normally thereinto to the very short distance which will produce a degree of compression of the air in the entire conduit from that point to the pressure gauge corresponding to the head or depth of liquid in the tank, so that that pressure indicated at the pressure gauge becomes a true indication of the depth of liquid in the tank, the gauge being desirably graduated in units of depth rather than in units of pressure.

The alternation of suction and pressure in the vacuum tank occurring quite frequently insures correspondingly frequent rectification of the condition of the air in the pressure pipe, and correction of the pressure gauge indication, in which error may, in the intervals, be caused by vaporization and absorption of the liquid by the confined air in the conduit leading to the pressure gauge or by leakage of air at any point in the conduit.

In the construction shown in Figure 2, which is the preferred form, the pump chamber, 60, comprises a larger diametered portion, 61, and a smaller diametered portion, 62, at the inner end of the larger portion,—that is, at the end toward which the piston member, 63, 64, is thrust and held yieldingly by the spring 22ª at the normal position of the parts. The larger and smaller portions of the piston, 63, 64, correspond in their diameters respectively to the larger and smaller portions of the piston chamber. The larger portion of the chamber has at the inner end a free atmospheric inlet port, 68, adjacent to the opening therefrom of the smaller portion, as seen at 68, this inlet port being designed to be sufficiently free to permit the piston to be thrust in by the spring without any substantial resistance or impediment by reason of the necessity for driving the air out through said inlet port; from which it results also that the retraction of the piston by suction at the suction phase of the vacuum tank is not materially impeded by resistance to the inflow of air through said relatively free inlet port. In this form there is formed integrally with the pump barrel and located laterally with respect thereto, a chamber, 76, and a discharge of air from the pump chamber by the spring-caused stroke of the piston is by way of the duct, 75, which leads from the upper end of the piston chamber by way of a downwardly extending pipe, 77, which opens at its lower end near the bottom of said laterally positioned chamber, 76, which contains a small amount of mercury, 78, into which the discharge end of the pipe, 77, projects slightly, causing said pipe to be sealed at its discharge. The two branches, 12, 12, of the pressure pipe are connected respectively at nipples, 76ª and 76ᵇ, projecting from said opposite sides of the chamber, 76, having ducts, 76ᶜ, connecting with the annular cavity around the pipe, 77, at a substantial distance above the mercury trap formed at the bottom of said chamber. In this form the air inlet or vent corresponding to the port, 29, of the form shown in Figure 4 is shown at 72 leading through the smaller portion, 64, of the piston from the inner end thereof, extending substantially to the plane of the enlargement to the greater diameter of the larger portion of the piston and thence radially to the surface of the piston for communication with inlet port, 68, formed through the wall of the larger portion of the piston chamber. The upper end of this duct is counterbored to form a valve seat for a check valve, 80, opening for movement of the air which enters through the port, 68, onward to the duct 75 leading for connection with the tube, 77, to and through the mercury tube to the pressure pipe, 12, said movement past the check valve occurring simultaneously with the entrance of the air through the ports, 72 and 68, during the down stroke of the piston, 63, caused during the partial vacuum phase of the vacuum tank, E.

The mercury trap described has the purpose of preventing leakage of air from the pipe line, 12, at either side. To insure against the possibility of the mercury being under any circumstances forced or drawn out of the trap, there is provided a felt plug, 82, in the chamber, 76, filling the annular space therein around the pipe, 77, and positioned for that purpose at the level of the connection of the two pipe members, 12, 12, with said chamber.

In any of the forms of the pump shown there may be provided means for operating the pump piston independently of the suction connection with a vacuum tank. This is shown in connection with the form illustrated in Figure 4 consisting of a stem, 85, terminating against the piston, 21, and extending out through the top of the piston chamber, for engaging the piston to thrust it down,—that is, against the reaction of the spring,—by pressure of the hand or foot of the operator upon the head of the protruding stem. If preferred, though not necessarily, this plunger rod may be engaged with the head of the piston so that it will be retracted and return with the piston when the latter is operated by the suction in the matter first described.

For preventing the "swash" of liquid in the tank, B, which occurs in travel over rough road, particularly when the liquid level in the tank is low, from producing pressure impulses in the pipe, 11, which are reflected in the gauge, rendering the depth indication difficult to read to a certainty, it is found desirable to provide at the intake of the pipe, 11, what may be called a baffle, which is seen in Figure 2 in the form of the enlargement, 11ª, at the end of the pipe, 11, commencing at a substantial distance above the level to which the liquid will normally rise in the pipe for producing the pressure to be transmitted to the gauge, and closing the pipe at the end except as to a limited entrance port, 11ᶜ, formed in the bottom closure, 11ᵇ. This limited port admits the access of the liquid properly for pressure to be transmitted through the pipe, 11, but prevents the liquid being driven up in the pipe by the momentary force of the "swash" of the tank contents; and this construction also ensures the retention of a sufficient amount of liquid to maintain the liquid seal which might otherwise be broken by "swashing" when the level is quite low.

I claim:—

1. In combination with a liquid container, means for indicating the depth of liquid contents thereof, comprising a pipe open for access of liquid pressure below the lowest level of liquid to be indicated, and extending upward to a point above the highest level of the liquid to be indicated; a pressure gauge comprising a pressure-responsive element; a duct connecting the upper end of the first mentioned pipe with the chamber of the pressure-responsive element; a pumping device comprising a chamber having a movable element by whose movement the cavity of the chamber is expanded and reduced; means yieldingly holding said movable member against movement away from a predetermined normal position, the chamber wall having an aperture constituting an outlet from the cavity of the chamber, and an aperture constituting an atmosphere inlet to the chamber cavity, means for controlling the air flow and operating for flow toward said duct and against reverse flow, said means comprising a liquid-containing trap interposed in connection of the pump with the duct which extends between the first mentioned pipe and the pressure gauge.

2. In combination with a liquid container, means for indicating the depth of liquid contents thereof, comprising a pipe open for access of liquid pressure below the lowest level of liquid to be indicated, and extending upward to a point above the highest level of the liquid to be indicated; a pressure gauge comprising a pressure-responsive element; a duct connecting the upper end of the first mentioned pipe with the chamber of the pressure-responsive element; a pumping device comprising a chamber having a movable member by whose movement the cavity of the chamber is expanded and reduced; means yieldingly holding said movable member against movement away from a predetermined normal position, the chamber wall having an aperture constituting an outlet from its cavity, and an aperture constituting an atmosphere inlet thereto; means controlling the air flow operating for flow toward said duct and against reverse flow, said means comprising a trap interposed in the duct which extends between the first mentioned pipe and the pressure gauge, said trap comprising a vertically extended chamber, a pipe leading from the air passage side of the pump into the lower end of said chamber and opening downwardly thereinto.

3. In combination with a liquid container, means for indicating the depth of the liquid contents thereof, comprising a pipe open for access of liquid pressure below the lowest level of liquid to be indicated and extending upward to a point above the highest level of the liquid to be indicated; a pressure gauge comprising a pressure-responsive element; a duct connecting the upper end of the first mentioned pipe with the chamber of the pressure-responsive element; a pumping device comprising a chamber having a movable member by whose movement the cavity of the chamber is expanded and reduced; means yieldingly holding said movable member against movement away from a predetermined normal position, the chamber wall having an aperture constituting an outlet from its cavity, and an aperture constituting an atmosphere inlet thereto; means controlling the air flow operating for flow toward said duct and against reverse flow, said means comprising a liquid-containing trap chamber formed integrally with the pump chamber, and having a top wall the air discharge passage from the pump comprising a duct formed in the wall of said integral chambers leading from the top of the pump chamber to the lower part of the trap chamber, the trap being formed by a tubular member extending down through the top wall of the chamber opening near the top wall of the chamber opening near the bottom thereof, and a suitable air-trapping liquid occupying the lower part of said trap chamber and tubular member; said trap chamber having at its upper end portion two out-leading connections leading respectively to the liquid container and to the pressure gauge, and constituting, together with the duct formed in said integral wall of the pump chamber and trap chamber, the duct connection between the pressure pipe in said liquid container and the pressure gauge.

In testimony whereof, I have hereunto set my hand at Chicago, Illinois, this 18th day of June, 1925.

LEONARD H. WHEELER.